United States Patent [19]
Martens et al.

[11] 3,860,252
[45] Jan. 14, 1975

[54] LOW CENTER OF GRAVITY TRAILER
[76] Inventors: Gust H. Martens; Phillip E. Runyan, both of Arapahoe, Nebr. 68922
[22] Filed: July 26, 1973
[21] Appl. No.: 382,772

[52] U.S. Cl.................. 280/2, 280/5 E, 280/98, 280/442
[51] Int. Cl............................................. B62d 53/08
[58] Field of Search......... 280/2, 5 E, 47.2, 98, 116, 280/132, 442

[56] References Cited
UNITED STATES PATENTS

| | | | |
|---|---|---|---|
| 338,394 | 3/1886 | Ebken................................. | 280/2 X |
| 852,112 | 4/1907 | Gilbreath............................ | 280/116 |
| 1,014,209 | 1/1912 | Dennis............................... | 280/116 X |
| 1,385,177 | 7/1921 | Lee..................................... | 280/2 X |
| 2,967,057 | 1/1961 | Meyer................................. | 280/5 E |
| 3,718,343 | 2/1973 | Mills.................................... | 280/5 E |

Primary Examiner—Robert B. Reeves
Assistant Examiner—David A. Scherbel
Attorney, Agent, or Firm—Victor J. Evans & Co.

[57] ABSTRACT

A low center of gravity trailer for carrying extremely heavy loads over rough ground without the danger of tipping. An underslung frame is supported on a transverse beam carrying rear wheels on the outer ends thereof. The frame is upwardly offset at the forward portion thereof and is supported by a pair of steerable front wheels which are mounted on an axle which can pivot about a horizontal longitudinal pivot to permit the front wheels to adjust to the ground conditions without twisting the frame. The trailer is especially adapted for hauling liquid and gaseous fertilizer in elongate horizontal tanks.

2 Claims, 9 Drawing Figures

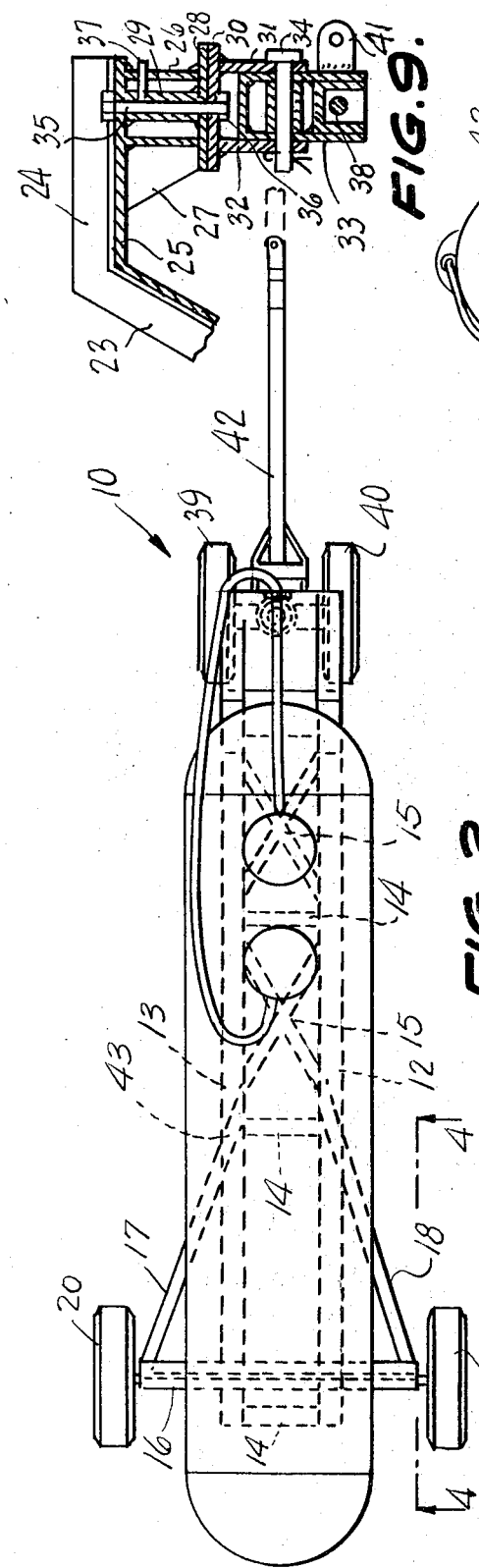
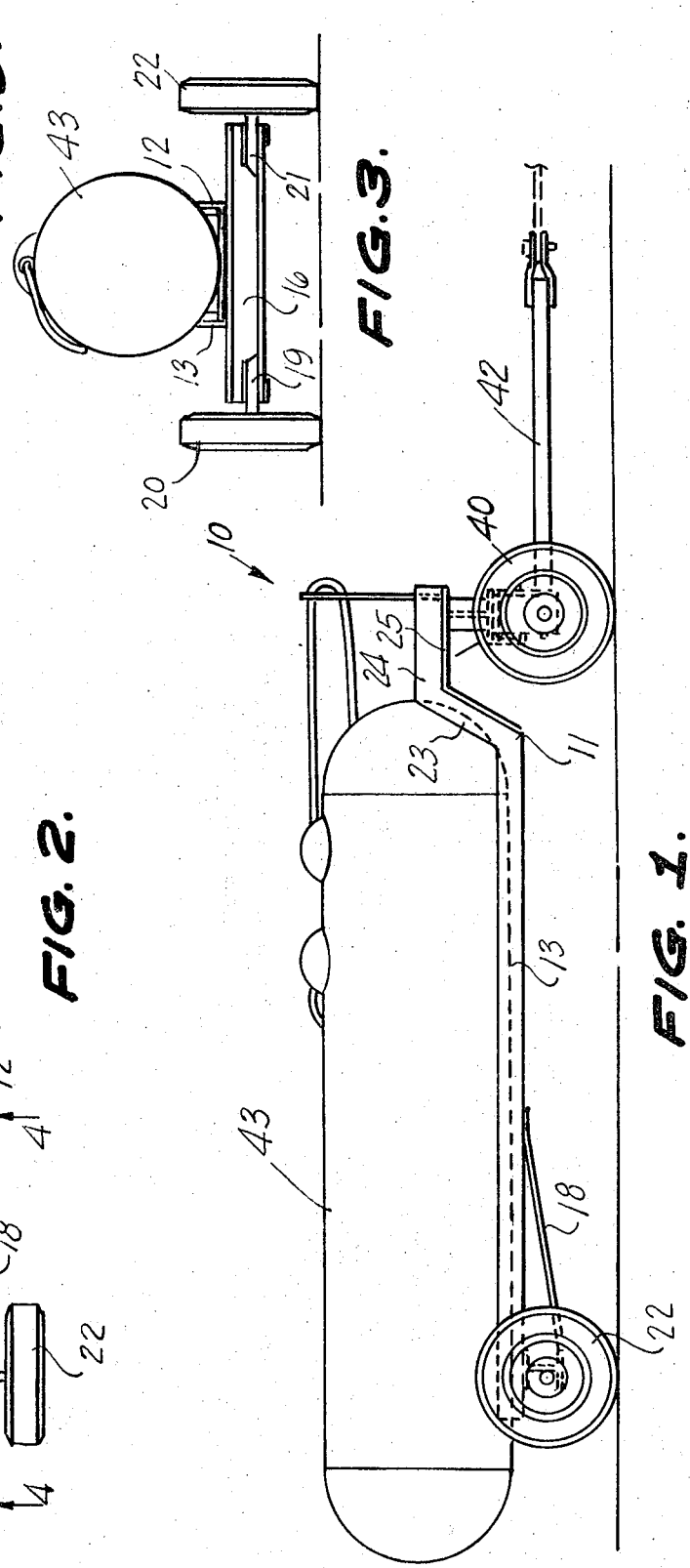

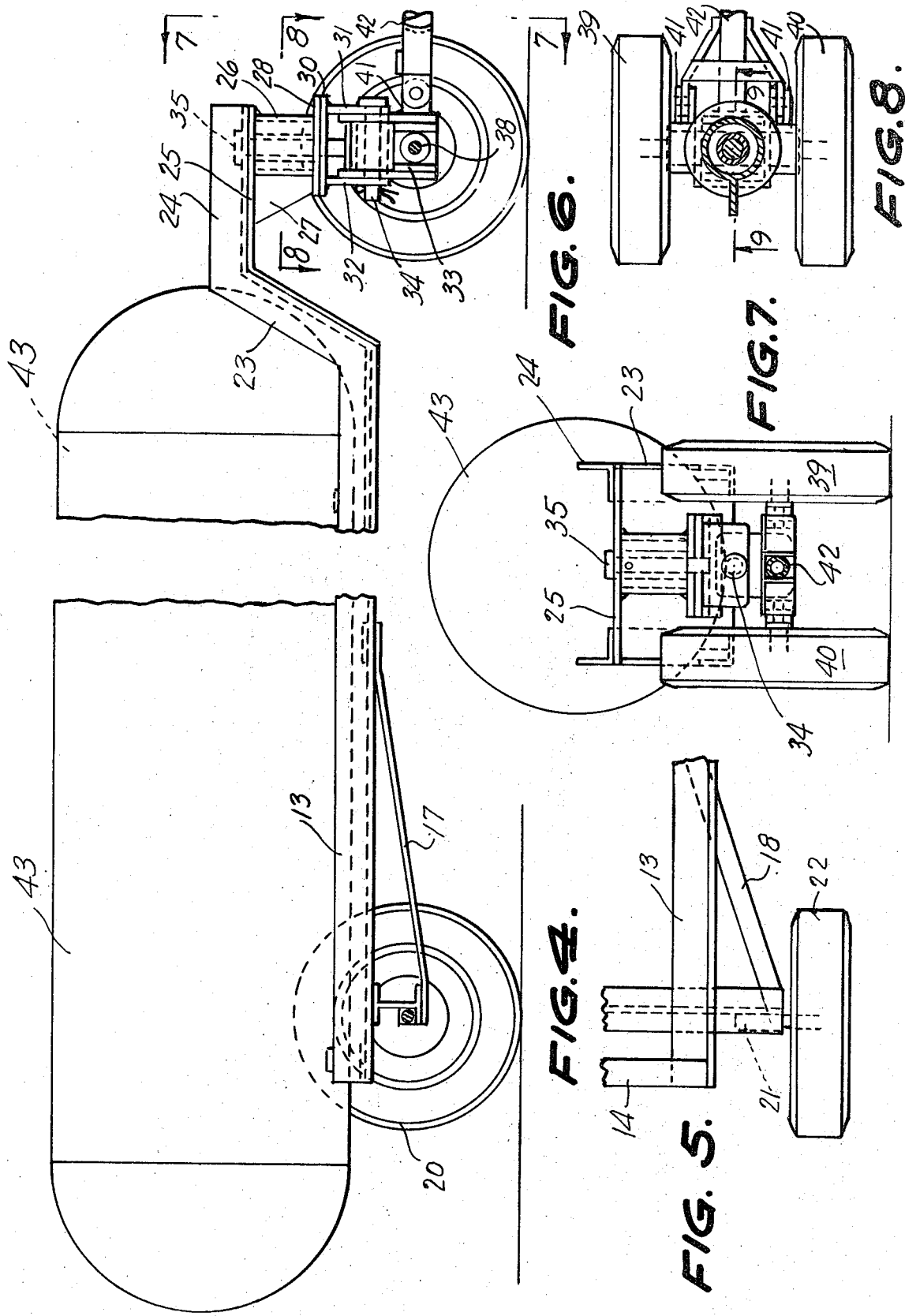

LOW CENTER OF GRAVITY TRAILER

BACKGROUND OF THE INVENTION

Field of the Invention

The present invention relates to low center of gravity trailers for carrying extremely heavy weight over rough ground.

SUMMARY OF THE INVENTION

The trailer includes a relatively low frame supported on a transverse beam carried by rear wheels with the forward portion of the frame upwardly offset to overlie a pair of front wheels which can be steered 360° and which are mounted on a longitudinal horizontal pivot to permit the front wheels to conform to ground conditions without twisting the frame.

The primary object of the invention is to provide a non-tipable low center of gravity trailer for moving extremely heavy loads over rough surfaces.

Other objects and advantages will become apparent in the following specification when considered in the light of the attached drawings.

BRIEF DESCRIPTION OF THE DRAWINGS

FIG. 1 is a side elevation of the invention;

FIG. 2 is a top plan view of the invention;

FIG. 3 is a rear end elevation of the invention;

FIG. 4 is an enlarged fragmentary sectional view, taken along the line 4—4 of FIG. 2, looking in the direction of the arrows with parts broken away for convenience of illustration;

FIG. 5 is a fragmentary top plan view of the rear axle mounting with the tank removed;

FIG. 6 is an enlarged fragmentary side elevation of the forward portion of the trailer shown partially broken away and in section for convenience of illustration;

FIG. 7 is a fragmentary transverse sectional view, taken along the line 7—7 of FIG. 6, looking in the direction of the arrows;

FIG. 8 is a fragmentary transverse horizontal sectional view, taken along the line 8—8 of FIG. 6, looking in the direction of the arrows; and FIG. 9 is an enlarged fragmentary vertical sectional view, taken along the line 9—9 of FIG. 8, looking in the direction of the arrows.

DESCRIPTION OF THE PREFERRED EMBODIMENT

Referring now to the drawings in detail, wherein like reference characters indicate like parts throughout the several figures, the reference numeral 10 indicates generally a low center of gravity trailer constructed in accordance with the invention.

The low center of gravity trailer 10 includes a generally horizontal frame 11 including a pair of spaced parallel frame members 12, 13. The frame members 12, 13 are secured together by transverse members 14 and by X-bracing 15 as can be seen in FIG. 2. An eyebeam 16 supports the rear end of the frame 11 and extends transversely thereacross. A pair of brace members 17, 18 are secured to the outer ends of the eyebeam 16 and have their forward ends respectively secured to the side members 13, 12 of the frame 11. The brace members 17, 18 prevent the eyebeam 16 from flexing during use.

A stub-axle is secured to one end of the eyebeam 16 and has a rear wheel 20 journalled thereon. A stub-axle 21 is secured to the opposite end of the eyebeam 16 and has a rear wheel 22 journalled thereon.

An upwardly and forwardly sloping section 23 is formed on the forward end of the frame 11 and has a horizontal front extension 24 secured thereto. The extension 24 includes a horizontal plate member 25 rigidly secured thereto.

A steel cylinder 26 is welded to the plate 25 in depending relation thereto and has a brace web 27 extending angularly between the tube 26 and the plate 25. A horizontal plate element 28 is welded to the lower end of the steel tubing 26 and a somewhat smaller tube or sleeve 29 is welded between the plate 25 and the plate 28 concentrically with the steel tubing 26. A plate piece 30 supports the plate 28 and is adapted to rotate with respect thereto. A pair of ears 31, 32 are rigidly secured to the plate 30 in spaced parallel relation and depend therefrom. A generally rectangular bolster 33 is positioned between the ears 31, 32 and a longitudinally extending generally horizontal pivot pin 34 extends through the ears 31, 32 and the bolster 33 to pivotally secure the bolster 33 to the ears 31, 32. A vertical pivot pin 35 extends down through the plate 25 through the small tube 29 and to the plates 28 and 30 with a head 36 on its lower end. The pivot pin 35 pivotally secures the plate 30 to the plate 28 so that the bolster 33 may swing about a vertical axis. A retainer pin 37 extends through the tubing 26 to secure the pivot pin 35 in position.

A transverse axle 38 extends through the bolster 33 and out each side thereof carrying a front wheel 39 on one end and a front wheel 40 on the opposite end with the wheels 39, 40 being journalled thereon.

A pair of ear members 41 are secured to the bolster 33 and are adapted to have a trailer tongue 42 secured thereto to pull the trailer 10 from a tractor or other draft vehicle. A generally horizontal cylindrical high pressure tank 43 is mounted on the frame 11 for carrying liquid or gaseous materials as required.

In the use and operation of the invention the tow bar 42 is connected to a tractor and with the tank containing the desired materials the trailer 10 is towed through the field with the front wheels 39, 40 pivoting about the vertical pivot 35 as they are steered and pivoting about the longitudinal horizontal pivot 34 as they adapt to the rough surface of the ground over which the trailer is passing.

Having thus described the preferred embodiment of the invention it should be understood that numerous structural modifications and adaptations may be resorted to without departing from the spirit of the invention.

What is claimed is:

1. In a low center of gravity trailer for carrying heavy loads over rough surfaces, a generally horizontal elongate frame including a pair of spaced parallel frame members, transverse members and X bracing securing said frame members together, a transverse eyebeam supporting the rear end of said frame and extending transversely thereacross, a pair of brace members having their rear ends secured to the outer ends of the eyebeam and having their forward ends respectively secured to the frame members of the frame, said brace members preventing the eyebeam from flexing during use, stub axles secured to the ends of the eyebeam and having rear wheels journalled thereon, an upwardly and forwardly offset sloping extension on the forward end of said frame and said extension having a horizontal front extension secured thereto and said front extension including a horizontal plate member rigidly secured thereto, a cylinder secured to said plate member in depending relation thereto, a brace web extending angularly between the cylinder and said plate member, a horizontal plate element secured to the lower end of the cylinder, a sleeve secured between the plate member and the plate element concentrically with the cylinder, a plate piece supporting the plate element and adapted to rotate with respect thereto, a pair of ears rigidly secured to said plate piece in spaced parallel relation and depending therefrom, a generally rectangular bolster positioned between the ears, a longitudinally extending generally horizontal pivot pin extending through the ears and the bolster to pivotally secure the bolster to the ears, a vertical pivot pin extending downwardly through the plate member, through the sleeve and to the plate element and plate piece so that the bolster may swing about a vertical axis, a retainer pin extending through the sleeve to secure the last-named pivot pin in position, a transverse axle extending through the bolster and out each side thereof, and a pair of front wheels journalled on said transverse axle.

2. A device as claimed in claim 1 and further including a pair of ear members secured to said bolster and adapted to have a trailer tongue secured thereto, and a generally horizontal cylindrical tank mounted on the frame for carrying materials therein.

* * * * *